(12) United States Patent
Forrest

(10) Patent No.: US 6,588,546 B1
(45) Date of Patent: Jul. 8, 2003

(54) TREE STAND

(76) Inventor: Lewis Forrest, R.R. #2, Arnprior, Ontario (CA), K7S 3G8

( * ) Notice: Subject to any disclaimer, the term of this patent is extended or adjusted under 35 U.S.C. 154(b) by 0 days.

(21) Appl. No.: 10/115,069

(22) Filed: Apr. 4, 2002

(51) Int. Cl.[7] .............................. A63B 27/00; E04G 3/00
(52) U.S. Cl. ........................................ 182/135; 182/187
(58) Field of Search ................................ 182/135, 136, 182/187, 188, 20, 116; 108/152, DIG. 2, 94, 102, 103; 297/217.7; 248/218.4

(56) References Cited

U.S. PATENT DOCUMENTS

| | | | |
|---|---|---|---|
| 4,488,620 A | | 12/1984 | Gibson |
| 4,589,522 A | | 5/1986 | Shelton |
| 4,595,079 A | * | 6/1986 | Shope ........................ 182/187 |
| 4,596,309 A | | 6/1986 | Venson |
| 4,942,942 A | | 7/1990 | Bradley |
| 4,969,538 A | * | 11/1990 | Amacker ..................... 182/187 |
| 4,997,063 A | * | 3/1991 | Bradley ....................... 182/187 |
| 5,097,925 A | | 3/1992 | Walker, Jr. |
| 5,101,934 A | * | 4/1992 | Zumbro ....................... 182/187 |
| 5,156,236 A | * | 10/1992 | Gardner et al. ............. 182/187 |
| 5,167,298 A | * | 12/1992 | Porter ......................... 182/187 |
| 5,234,076 A | | 8/1993 | Louk et al. |
| 5,297,656 A | * | 3/1994 | Amacker ..................... 182/187 |
| 5,310,019 A | * | 5/1994 | Paul ........................... 182/187 |
| 5,316,104 A | * | 5/1994 | Amacker ..................... 182/187 |
| 5,379,861 A | * | 1/1995 | Amacker ..................... 182/187 |
| 5,492,198 A | * | 2/1996 | Williams ..................... 182/136 |
| 5,564,524 A | * | 10/1996 | Thaggard et al. ........... 182/116 |
| 5,628,383 A | * | 5/1997 | McIntyre ..................... 182/187 |
| 5,641,036 A | * | 6/1997 | Maxwell ..................... 182/135 |
| 5,775,464 A | | 7/1998 | Gardner |
| 5,842,541 A | | 12/1998 | Arcuri |
| 5,862,883 A | | 1/1999 | Carriere |
| 5,887,676 A | * | 3/1999 | Harbin ........................ 182/20 |
| 5,921,348 A | | 7/1999 | Louk et al. |
| 5,975,242 A | | 11/1999 | Woller et al. |
| 6,182,792 B1 | * | 2/2001 | Woller et al. ............... 182/187 |
| 6,264,000 B1 | | 7/2001 | Johnson |
| 6,308,800 B1 | * | 10/2001 | Graham, Jr. ................ 182/136 |

* cited by examiner

Primary Examiner—Daniel P. Stodola
Assistant Examiner—Hugh B. Thompson
(74) Attorney, Agent, or Firm—George A. Seaby

(57) ABSTRACT

A relatively simple tree stand includes a generally rectangular platform with locking arms at one end thereof; teeth pivotally connected to the arms for gripping a tree trunk; a pair of support arms pivotally connected to the sides of the platform near a second end thereof, a generally V-shaped end wall pivotally connected to free ends of the tubular support arms; a catch for releasably retaining the end wall in a vertical, erect position; a belt retained by latches in the support arms for forming a first loop around a tree trunk, and a cord for forming a second loop around the trunk beneath the first loop.

10 Claims, 7 Drawing Sheets

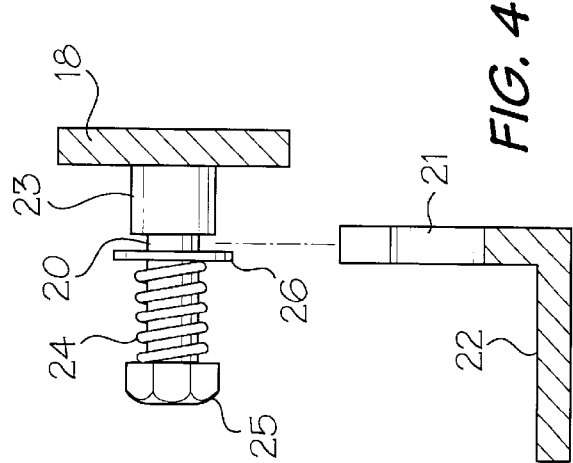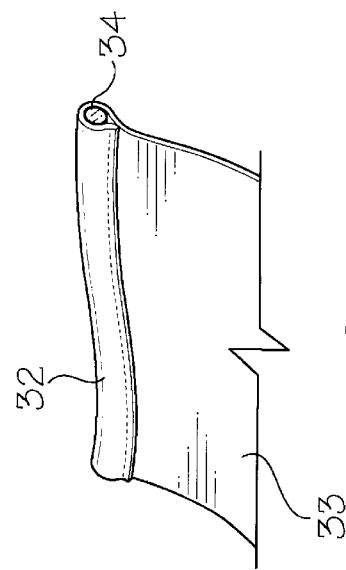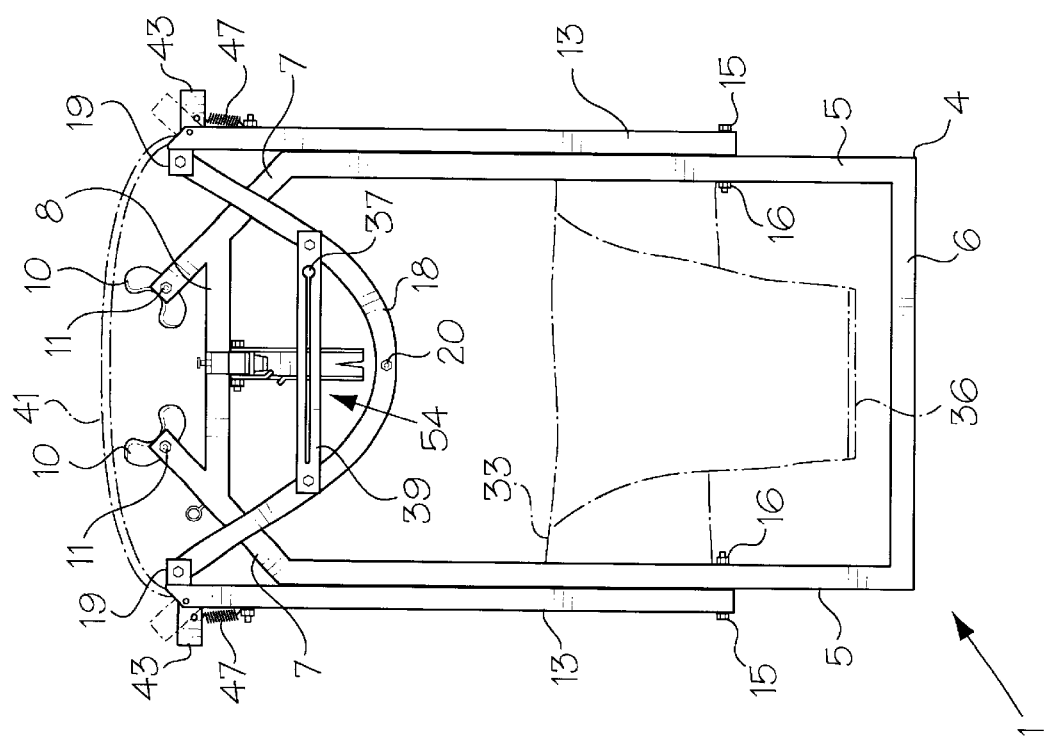
FIG. 4
FIG. 5
FIG. 3

TREE STAND

BACKGROUND OF THE INVENTION

1. Field of the Invention

This invention relates to a tree stand, and in particular to a stand which can be used to climb and support a load in a tree.

2. Discussion of the Prior Art

Tree stands are load supporting platforms used primarily by hunters. The stands are used to climb a tree and to support a hunter at an elevated position on the trunk of a tree. Most conventional tree stands are formed of two parts, including a top or seat platform and a bottom or footrest platform. Examples of such tree stands are disclosed by U.S. Pat. Nos. 4,488,620, issued to L. R. Gibson on Dec. 18, 1984; 4,589,522, issued to D. L. Shelton on May 10, 1986; 4,596,309, issued to J. W. Venson on Jun. 24, 1986; 4,942,942, issued to R. E. Bradley on Jul. 24, 1990; 5,097,925, issued to G. T. Walker, Jr. on Mar. 24, 1992; 5,234,076, issued to R. L. Louk et al on Aug. 10, 1993; 5,775,464, issued to B. D. Gardner on Jul. 7, 1998; 5,842,541, issued to N. Arcuri on Dec. 1, 1998; 5,862,883, issued to S. N. Carriere on Jan. 26, 1999; 5,921,348, issued to J. M. Louk et al on Jul. 13, 1999; 5,975,242, issued to R. R. Woller et al on Nov. 2, 1999 and 6,264,000, issued to S. M. Johnson on Jul. 24, 2001.

There are literally dozens of different tree stands available in the marketplace. In general, existing tree stands are somewhat complicated and bulky, and consequently expensive to manufacture. Moreover, many two platform stands are not readily stackable, and thus are difficult to carry through the woods. In other words, in spite of the large number of different tree stands available, there is still room for improvement.

GENERAL DESCRIPTION OF THE INVENTION

An object of the present invention is to provide a relatively simple, collapsible tree stand, which is easy to erect and collapse, and which is readily stackable to facilitate carrying.

Another object of the invention is to provide a tree stand which when mounted on a tree trunk can be securely locked in one position, reducing the danger of rotation or other movement on the trunk.

Accordingly, the invention relates to a tree stand comprising a planar load supporting platform; locking arms on one end of said platform with spaced apart free ends; teeth rotatable on said locking arms for engaging a tree trunk at spaced apart locations; support arms pivotally connected to sides of said platform having first ends pivotally connected to opposite sides of said platform, and second, free ends, said support arms being rotatable between a collapsed position against said platform and an erect position in which said free ends of the support arms are elevated above the platform; a substantially V-shaped end wall pivotally connected to said free ends of said support arms; said end wall being rotatable between a collapsed position overlying the platform for storage or transporting of the stand, and an erect position in which the end wall is substantially perpendicular to the platform; a catch on said platform for releasably locking said end wall in the erect position; a belt having free ends slidable in said free ends of said support arms for forming a first loop around a tree; latches on said support arms for releasably locking the free ends of said belt in the free ends of said support arms; a cord having one end attached to said platform for forming a second loop around a tree beneath said first loop; and tensioner on said platform for tensioning and releasably locking a second end of said cord to the platform, whereby the platform can be securely anchored to a tree.

BRIEF DESCRIPTION OF THE DRAWINGS

The invention is described below in greater detail with reference to the accompanying drawings, which illustrate a preferred embodiment of the invention, and wherein:

FIG. 3 is a top view of an upper platform used in the tree stand of FIGS. 1 and 2 in the collapsed condition;

FIG. 4 is a cross section of a catch assembly used in the tree stand of FIGS. 1 and 2;

FIG. 5 is an isometric view of one end of a seat used on the upper platform of FIGS. 1 to 3;

DESCRIPTION OF THE PREFERRED EMBODIMENT

Figure 1:
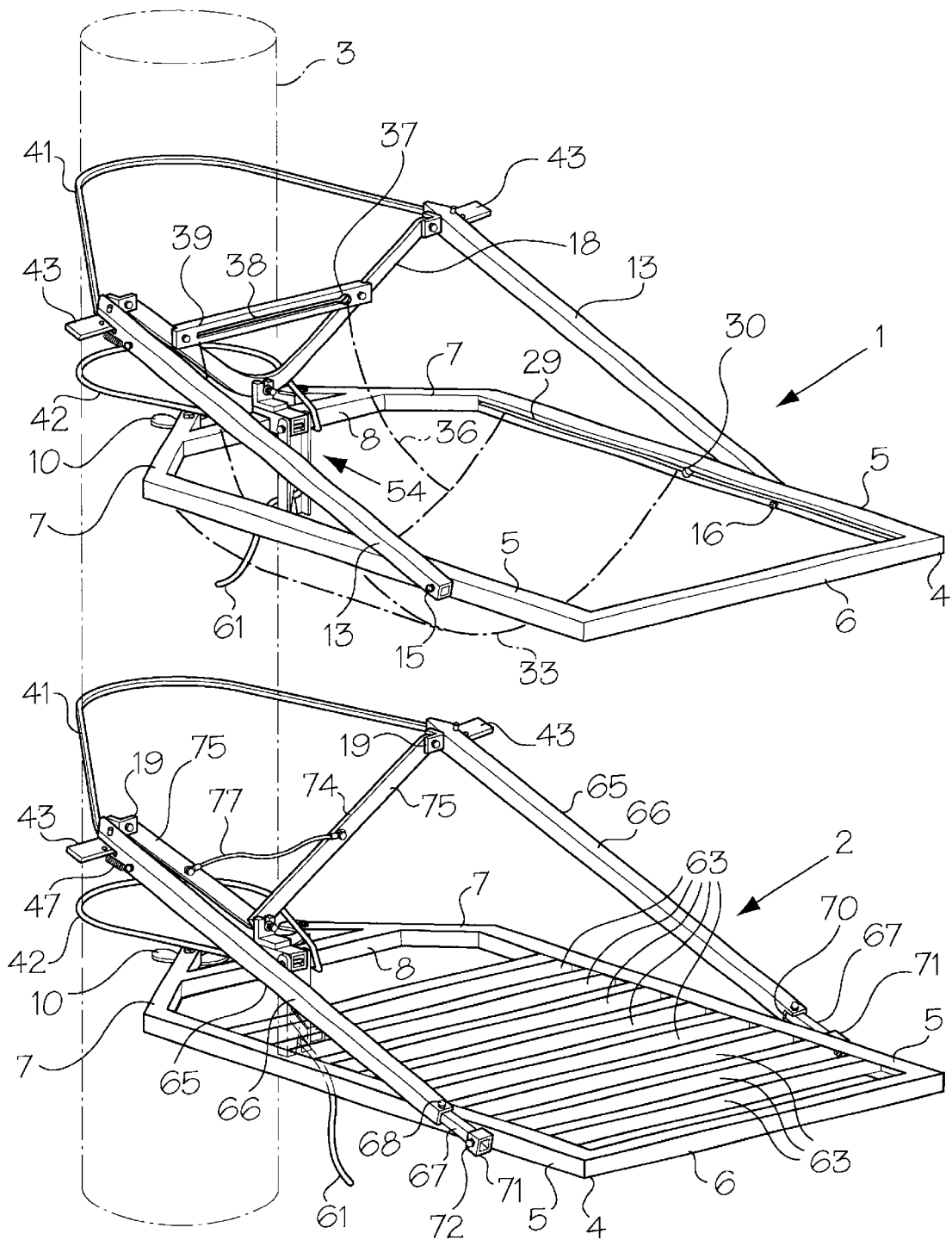
FIG. 1 is an isometric view of a tree stand in accordance with the present invention in the use or erected condition on a tree.

Referring to FIG. 1, the preferred embodiment of the tree stand of the present invention includes upper and lower platforms indicated generally at 1 and 2, respectively. The platforms 1 and 2 are used to climb a tree 3, and, once the desired location in the tree has been reached, the platforms are securely connected to the tree for use as a seat (platform 1) and a footrest (platform 2).

Figure 2:
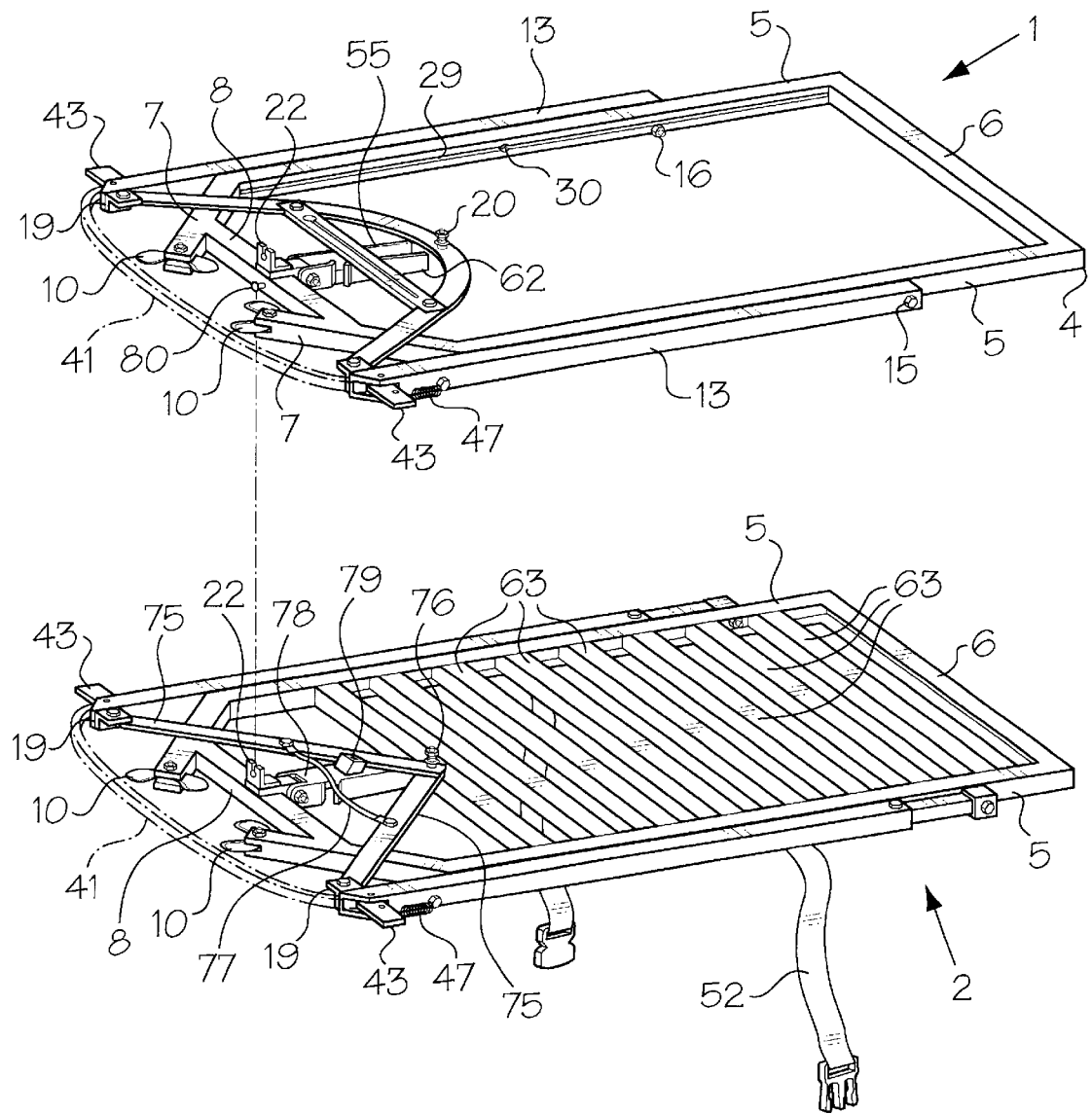
FIG. 2 is an exploded, isometric view of the tree stand of FIG. 1 in the non-use or collapsed condition.

As best shown in FIGS. 1 to 3, the upper platform 1 is defined by a generally rectangular frame 4, which includes straight sides 5, and one straight end 6. A pair of converging, locking arms 7 interconnected by a crossbar 8 define the other end of the frame 4. Wing-shaped teeth 10 are pivotally mounted in the notched free ends of the arms 7 by pins 11. The teeth 10 have sharpened outer edges for biting into a tree 3 when the platform 1 is mounted on the tree. The use of pivotal teeth 10 makes the platform readily adaptable to trees of different shapes and diameters. One tooth can be at a substantially different angle to the free end of the arm 7 than the other tooth. When the platform is mounted on a small diameter tree, the sharp edges of the teeth rotate towards each other, and, on a large diameter tree, the teeth 10 rotate in the opposite direction. In both cases, there is good gripping contact between the outer, sharp edges of the teeth and the tree, reducing the likelihood of rotation of the platform of the tree. Moreover, the use of the teeth 10 results in substantially less damage to a tree than sawtooth teeth.

A pair of support arms 13 are pivotally connected to the sides 5 near the straight end 6 by bolts 15 and nuts 16. The ends of a generally V-shaped end wall 18 are pivotally connected to the other, free ends of the arms 13 by L-shaped brackets 19. The arms 13 and the end wall 18 can be rotated between a collapsed position (FIGS. 2 and 3) and an erected use position (FIG. 1). In the collapsed condition of the upper platform 1, the arms 13 lie against the sides 5 in the same plane as the frame 4, and the end wall 18 lies flat on the arms 7. Because the end wall 18 is formed from a thin strip of metal, the upper platform 1 has a low profile in the collapsed condition.

In order to erect the upper platform 1, it is merely necessary to rotate the arms 13 upwardly around the axes of the bolts 15, and then rotate the end wall 18 downwardly to a more or less vertical position. The end wall 18 is moved sufficiently above the frame 4 that a bolt 20 on the bottom center thereof is above a keyhole-shaped notch 21 in an L-shaped catch 22.

The bolt 20 is mounted in a sleeve 23 on the end wall 18. A helical spring 24 between the head 25 of the bolt 20 and a washer 26 biases the washer towards the sleeve 23. When bolt 20 is pushed into the notch 21, the spring 24 is compressed and presses against the washer 26 to releasably lock the end wall 18 to the frame 4. The catch 22 is mounted on a base 28 defined by a short length of square cross section tube on the center of the cross bar 8. The rigid end wall 18 on the upper platform 1 ensures that the arms 13 remain well separated on the seat platform. With some platform structures on a narrow tree, the tree ends of the sides are pulled towards each other, reducing the area on the seat available to a user.

A narrow slot 29 extends longitudinally of each side 5 of the frame 4. A larger, circular area 30 of the slot 29 receives one thick end 32 of a generally T-shaped, fabric seat 33. Such thick end 32 is formed by folding each free end of the seat 33 over on itself and on a cord 34, and sewing the folded free end closed. The stem 36 of the seat defines a backrest. The free end of the stem 36 is inserted into a circular opening 37 at one end of another slot 38 in a crossbar 39 mounted on the end wall 18. When the frame 4 is being folded or collapsed, the seat 33 can be left in position or folded over the remainder of the seat (FIG. 3.). In order to collapse the frame 4, it is merely necessary to pull the bolt 20 vertically out of the notch 21, rotate the end wall 18 upwardly with the brackets 19, and then fold the arms 13 with the end wall 18 downwardly into the plane of the frame 4.

Figure 6:
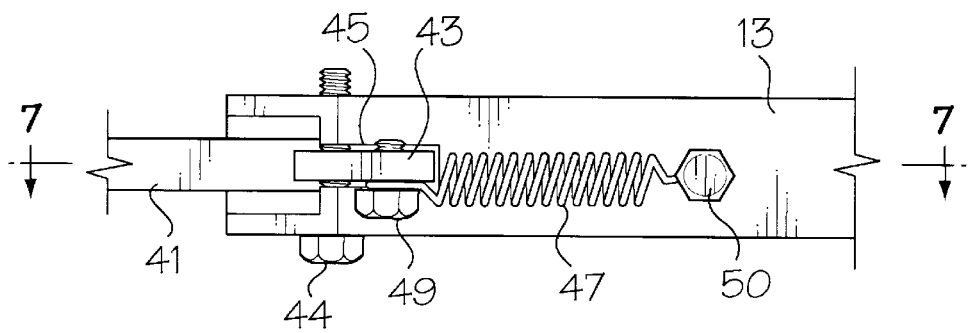
FIG. 6 is a side view of a belt latch used in the tree stand of FIGS. 1 and 2.
Figure 7:
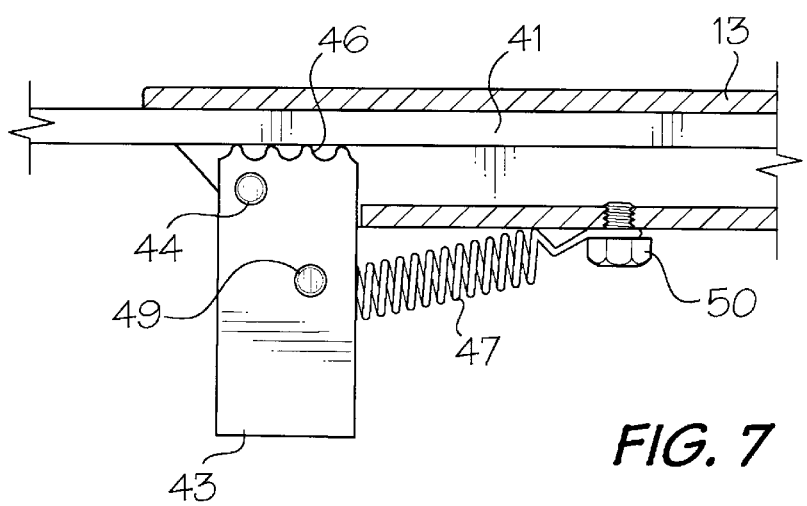
FIG. 7 is a cross section taken generally along line 7—7 of FIG. 5.

The frame 4 is retained in a fixed position on a tree 3 by a length of belt 41, which can be a conventional V-belt, and by a cord 42. The free ends of the length of belt 41 are inserted into the open free ends of the arms 13, Such free ends of the belt are retained in the arms 13 by latches defined by levers 43 pivotally mounted on bolts 44 in slots 45 (FIG. 6) in the ends of the arms. Each lever 43 has teeth 46 on the inner end thereof for engaging and biting into the belt 41. The lever 43 is biased to the belt engaging position by a helical spring 47 extending between a bolt 49 in the lever 43 and a bolt 50 in the side of the arm 13. In order to insert the belt 41 into the arm 13, to adjust the position of the belt or to remove the belt from the arm 13, the lever 43 is manually rotated to a release position (shown in phantom outline in FIG. 3 and in FIG. 7). When the belt 41 is in the desired position, the lever 43 is released to again lock the end of the belt in a fixed position.

Initially, when climbing a tree 3, the belt 41 is loose, i.e. forms a relatively large loop around the tree. The platform 1 is manually tilted upwardly so that the belt can be slid up the trunk of the tree. When the platform 1 is released, it falls back to a roughly horizontal position, in which the teeth 10 engage the trunk and the belt 41 is under tension. The same procedure is carried out using the feet which are strapped to the lower platform 2 using a strap 52 (FIG. 2). Because the end wall 18 has an inverted U-shape, it does not interfere with tilting of the platform 1 during tree climbing.

Figure 8:
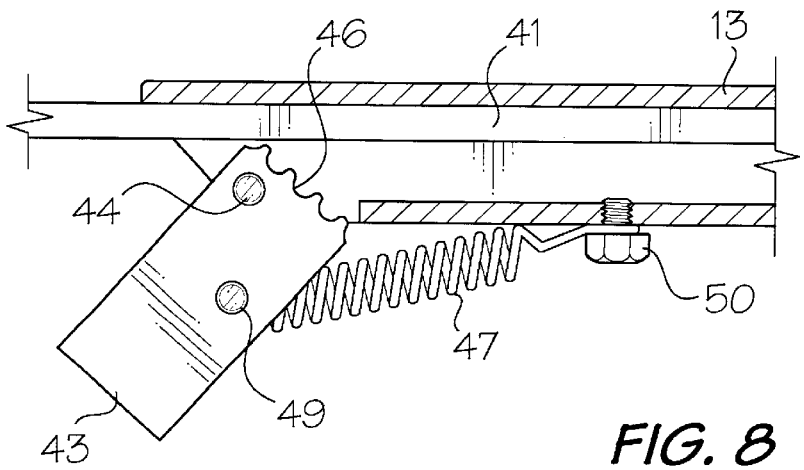
FIG. 8 is a cross section similar to FIG. 7.
Figure 9:
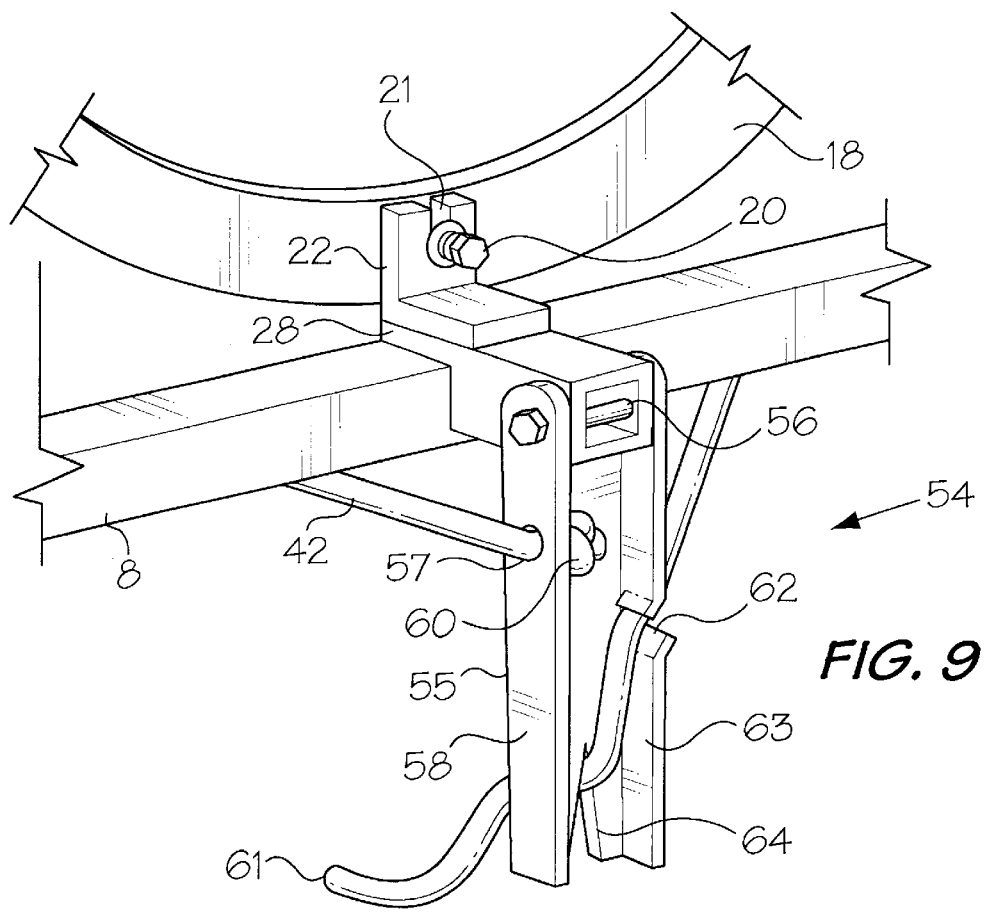
FIGS. 9 and 10 are isometric views of a cord tensioner used in the tree stands of FIGS. 1 and 2.
Figure 10:
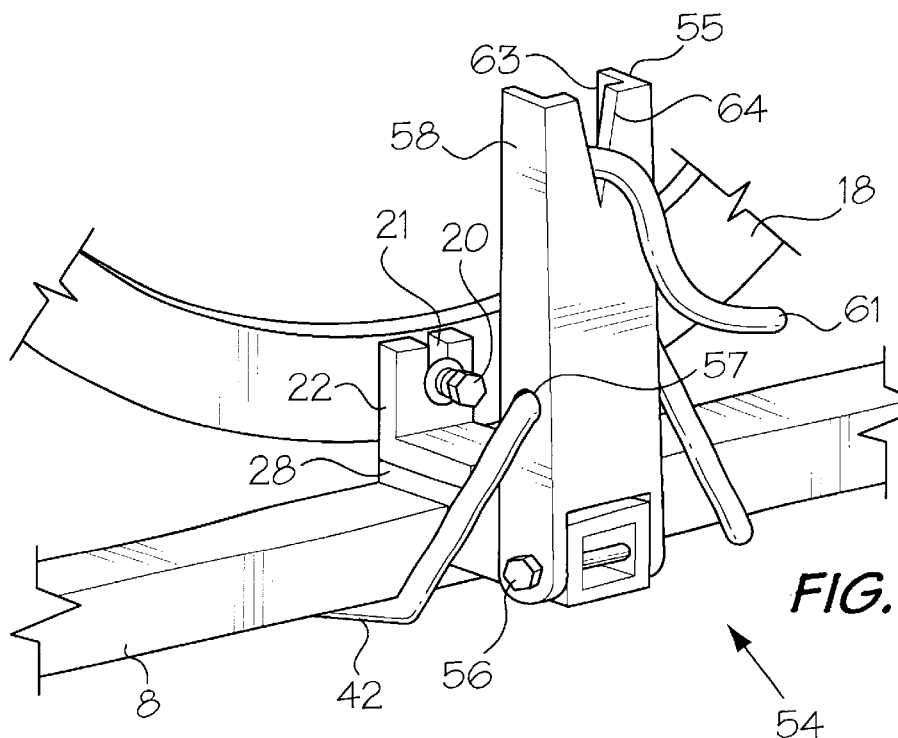

When the platforms 1 and 2 are in the desired location on the tree, they are locked into position using the cord 42, and a tensioner indicated generally at 54 (FIGS. 8 and 9). The tensioner 54 includes a lever 55 pivotally connected by a bolt 56 to the inner free end of the bar 28 for rotation between a lower, vertical release position (FIG. 9) and an upper vertical locked position (FIG. 10). The lever 55 is generally U-shaped in cross section. One end of the cord 42 is inserted through a hole 57 in one side 58 of the lever 55, and is tied into a knot 60. The cord 42 is passed beneath the crossbar 8 and around the tree 3. The free end of the cord 42 is inserted via a notch 62 in the other side 63 of the lever 55 into a V-shaped notch 64 in the free end of the lever. With the free end 61 of the cord 42 secured in the notch 64, the lever 55 is rotated upwardly through approximately 180° to tension the cord around the tree, securely anchoring the frame 4 of the platform to the tree. To unlock the tensioner, it is merely necessary to pull on the free end 61 of the cord 64 which causes the lever 55 to rotate to the release position where the cord can be removed form the lever.

The lower platform 2 is virtually identical to the upper platform 1, and accordingly some of the same reference numerals are used to identify the same or similar elements.

Figure 12:
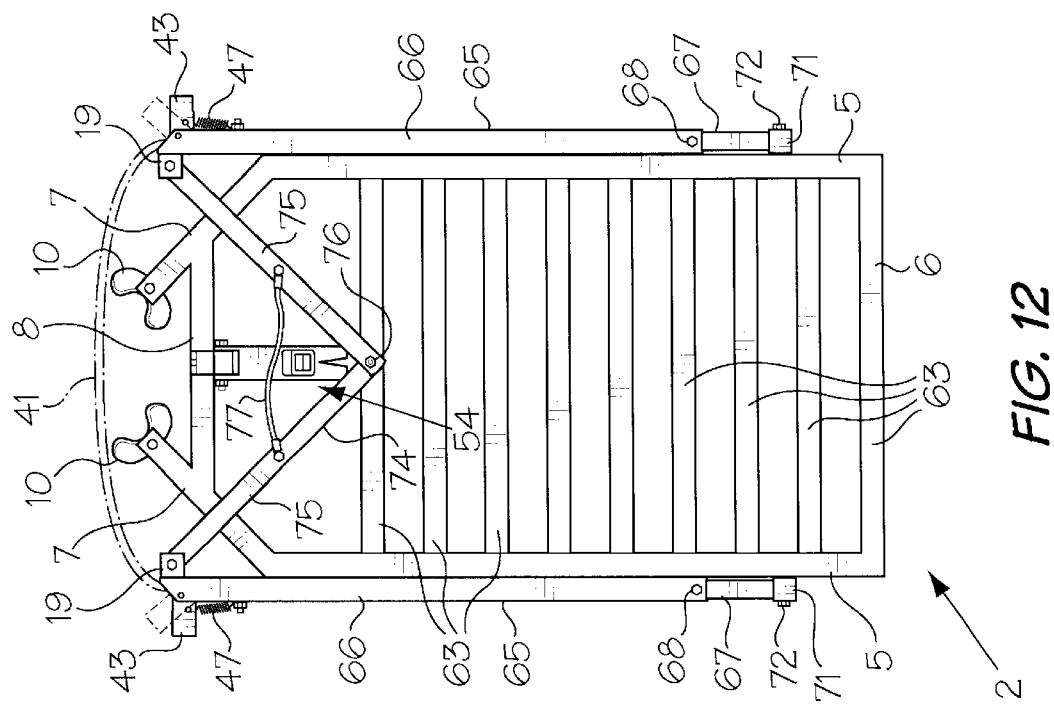
FIG. 12 is a top view of a lower platform used in the tree stand of FIGS. 1 and 2.

With reference to FIGS. 1, 2 and 12, the lower platform 2 includes a rectangular frame 4 with straight sides 5, a straight end 6, and converging arms 7 interconnected by a crossbar 8 and carrying teeth 10. Because the lower platform 2 is intended to support the feet of a user, a plurality of parallel crossbars 63 extend between the sides 5. A pair of support arms 65, which are similar to the arms 13, are pivotally connected to the sides 5 of the frame 4 near the end 6. Each arm 65 includes an elongated tubular section 66 pivotally connected to one end of a short bar 67 for rotation around the vertical axis of a pin 68. A notch 70 (FIG. 1) in the section 66 permits limited rotation of the section 66. Thus, the free ends of the support arms can be rotated laterally with respect to the platform 2 to change the curvature of the belt 41 to accommodate tree trunks of different diameters. The other end of the bar 67 is pivotally connected to the frame side 5 by a sleeve 71 and a bolt 72 for rotation around a horizontal axis.

The single-piece end wall 18 of the upper platform 1 is replaced by a V-shaped end wall 74 defined by two strips 75 pivotally connected to the arms 65 by brackets 19, and to each other by a bolt 76, which performs the same function as the bolt 20 on the upper platform. The middles of the strips 75 are interconnected by a short cable 77, which limits outward movement of the strips 75. Inward lateral movement of the top ends of the arms 65 in the erect condition results in less stress on the arms when the stand is mounted on a small diameter tree.

As shown in FIG. 2, on the lower platform 2, the lever 78 for tensioning the lower cord 42 around a tree trunk 3 is the reverse of the lever 55, i.e. it has an inverted U-shaped cross section. In the release position, the lower lever 78 extends upwardly at an angle of approximately 45°. The cord 42 is passed over the lower platform crossbar 8 and around the tree 3. In order to tension the cord 42, a user presses down on an inclined post 79 on the lever 78 using his/her foot to rotate the lever downwardly beneath the plane of the platform. In the locked position, the lever 78 extends vertically downwardly perpendicular to the horizontal plane of the lower platform 2.

Figure 11:
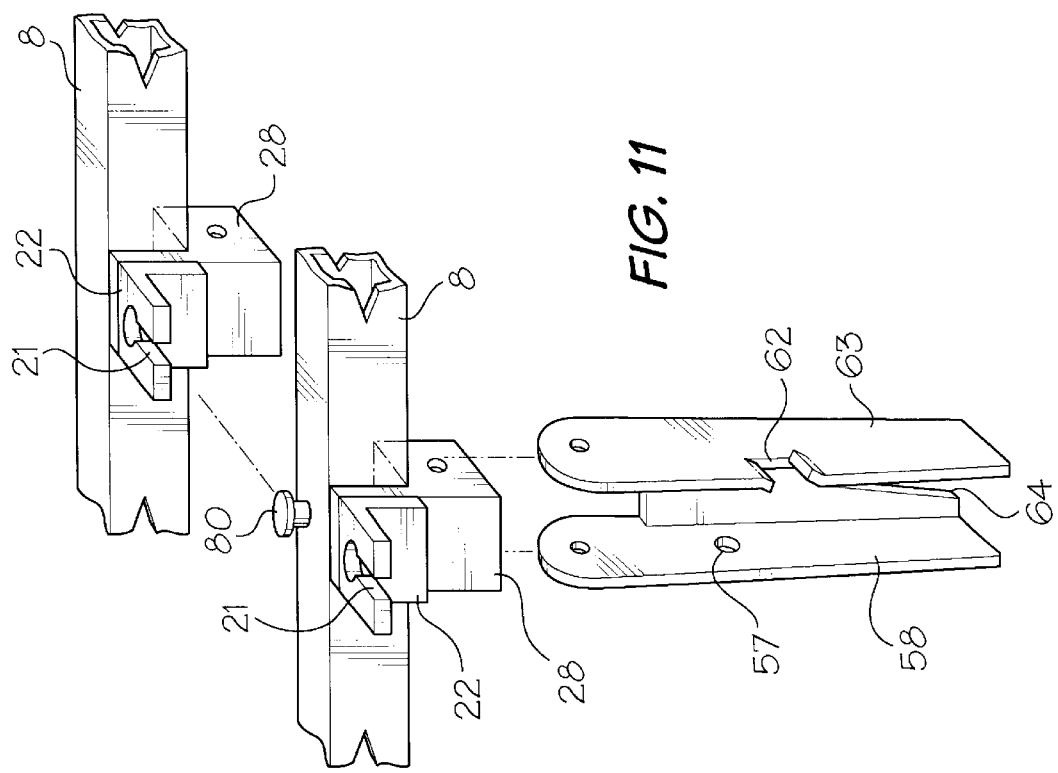
FIG. 11 is an exploded, isometric view of the tensioner of FIGS. 8 and 9.
Figure 13:
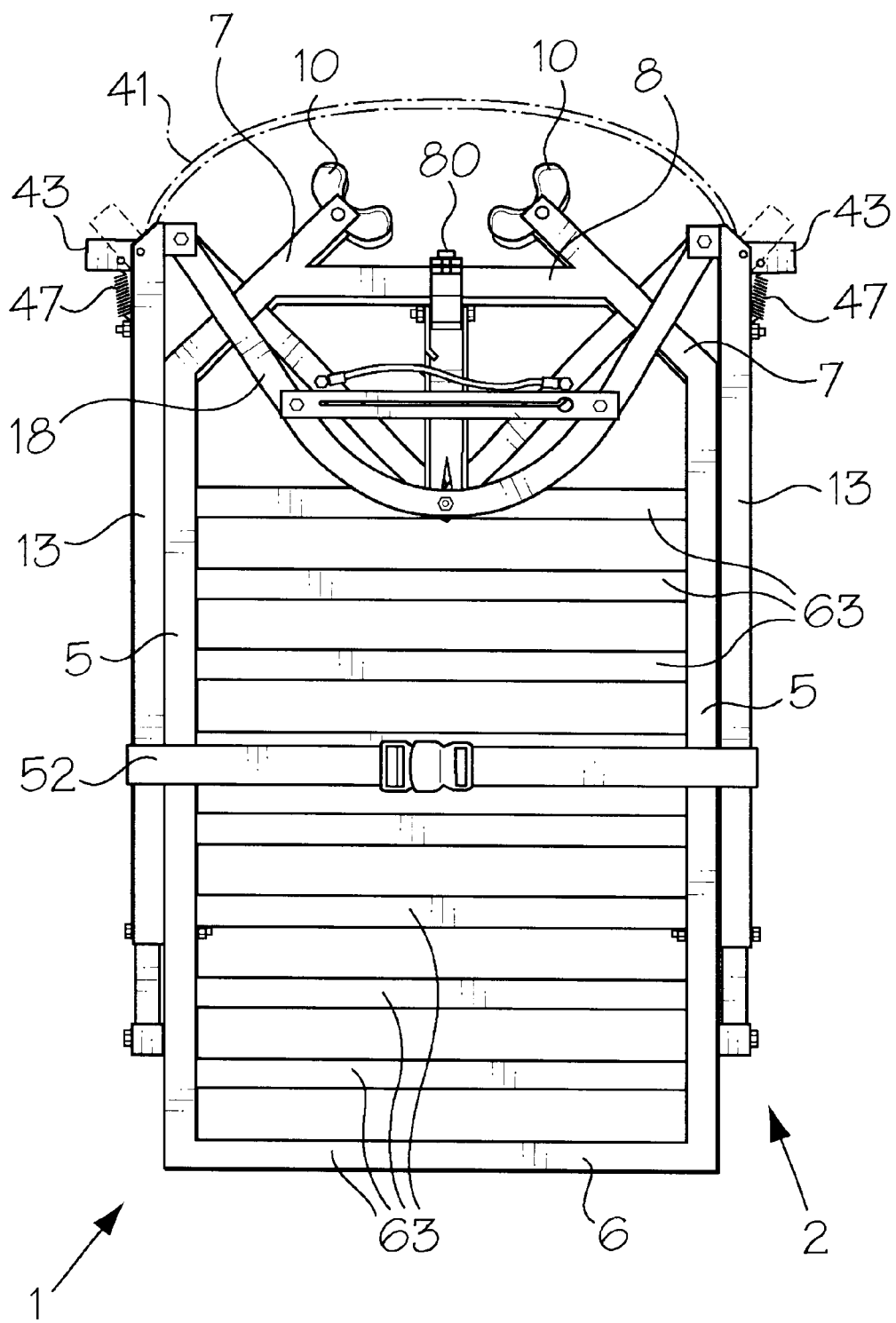
FIG. 13 is a top view of the upper and lower platforms in the stacked condition.

Referring to FIGS. 2, 11 and 13, when the platforms 1 and 2 are not in use they can be stacked and connected together for storage or transporting. For such purpose, a pin 80 extends outwardly from the side of the crossbar 8 of the upper platform 1 opposite to the tensioner lever 55, i.e. between the free ends of the arms 7. With the ends 18 and 74 folded against their respective frames 4, the pin 80 is slid into the keyhole shaped notch 21 in the bracket 22 on the platform 2. The platforms 1 and 2 are tied together using the foot strap 52.

While the tree stand has been described as including a pair of platforms 1 and 2, in fact each platform constitutes a tree stand. In the appended claims, the tree stand is defined as a single platform.

I claim:

1. A tree stand comprising a planar load supporting platform; locking arms on one end of said platform with spaced apart free ends; teeth rotatable on said locking arms for engaging a tree trunk at spaced apart locations; support arms pivotally connected to sides of said platform having first ends pivotally connected to opposite sides of said platform, and second, free ends, said support arms being rotatable between a collapsed position against said platform and an erect position in which said free ends of the support arms are elevated above the platform; a substantially V-shaped end wall pivotally connected to said free ends of said support arms; said end wall being rotatable between a collapsed position overlying the platform for storage or transporting of the stand, and an erect position in which the end wall is substantially perpendicular to the platform; a catch on said platform for releasably locking said end wall in the erect position; a belt having free ends slidable in said free ends of said support arms for forming a first loop around a tree; latches on said support arms for releasably locking the free ends of said belt in the free ends of said support arms; a cord having one end attached to said platform for forming a second loop around a tree beneath said first loop; and tensioner on said platform for tensioning and releasably locking a second end of said cord to the platform, whereby the platform can be securely anchored to a tree.

2. The tree stand of claim 1, wherein said platform includes a first crossbar interconnecting said free ends of said locking arms and supporting said catch, a pair of straight sides contiguous with said locking arms, and a straight second end interconnecting said straight sides.

3. The tree stand of claim 2, including a second crossbar on said end wall; a substantially T-shaped flexible seat on said frame for supporting a user; and slots in said frame sides and in said second crossbar for receiving and retaining ends of said seat.

4. The tree stand of claim 3, wherein said seat ends are thicker than the remainder of the seat, and said slots includes circular openings for admitting the seat ends to the slots.

5. The tree stand of claim 2, wherein said catch includes a keyhole shaped notch; and a first pin on said end wall for insertion into said keyhole notch when the end wall is in the erect position.

6. The tree stand of claim 5, including a second pin on said first crossbar for insertion into a notch of a second similar platform to interconnect two platforms for transport or storage.

7. The tree stand of claim 2, wherein said tensioner includes a lever pivotally mounted on said first crossbar for rotation between cord release and cord tensioning positions, and cooperating notches in said lever for retaining said second end of the cord, whereby when the lever is rotated to the tensioning position the cord is tightened.

8. The tree stand of claim 2, wherein said teeth are wing-shaped with sharpened outer edges for engaging a tree trunk at spaced apart locations.

9. The tree stand of claim 1, wherein said support arms are pivotally connected to the sides of said platform for rotation around two axes, whereby the free ends of said support arms can be rotated laterally with respect to the platform to change the curvature of said first loop.

10. The tree stand of claim 9, wherein said end wall includes two straight strips pivotally connected to each other at one end, and pivotally connected to said support arms at a second end; and a cable extending between said strips for limiting rotation of the strips with respect to each other, and consequently limiting outward lateral movement of said support arms with respect to the platform.

* * * * *